United States Patent
Zhang

(10) Patent No.: US 9,749,807 B2
(45) Date of Patent: Aug. 29, 2017

(54) METHOD AND DEVICE FOR DISPLAYING INFORMATION WHICH LINKS TO RELATED INFORMATION PROVIDED BY USER'S FRIENDS AT USER'S LOCATION

(71) Applicant: Tencent Technology (Shenzhen) Company Limited, Shenzhen (CN)

(72) Inventor: Xiao Long Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/981,517

(22) Filed: Dec. 28, 2015

(65) Prior Publication Data
US 2016/0119757 A1    Apr. 28, 2016

Related U.S. Application Data

(63) Continuation of application No. PCT/CN2015/070483, filed on Jan. 9, 2015.

(30) Foreign Application Priority Data

Mar. 13, 2014   (CN) .................. 2014 1 0092964 3

(51) Int. Cl.
H04W 24/00     (2009.01)
H04W 4/02      (2009.01)
G06F 17/30     (2006.01)

(52) U.S. Cl.
CPC ............ *H04W 4/028* (2013.01); *G06F 17/30* (2013.01); *G06F 17/30882* (2013.01)

(58) Field of Classification Search
CPC ... G06F 17/30; G06F 17/30882; H04W 4/028
(Continued)

(56) References Cited

U.S. PATENT DOCUMENTS

2005/0227711 A1* 10/2005 Orwant ................. H04W 4/12
455/456.3
2008/0280600 A1* 11/2008 Zhou ................. G06F 17/3087
455/415
(Continued)

FOREIGN PATENT DOCUMENTS

CN         101911066 A      12/2010
CN         102760129 A      10/2012
(Continued)

OTHER PUBLICATIONS

International Search Report of PCT/CN2015/070483 dated Mar. 27, 2015 (13p).
(Continued)

*Primary Examiner* — Babar Sarwar
(74) *Attorney, Agent, or Firm* — Brinks Gilson & Lion

(57) ABSTRACT

The present disclosure discloses a method and device for displaying information which links to related information provided by user's friends at user's location. The method including the operations of: obtaining first user's information viewing operation performed on information associated with the first user; obtaining position information included in the information; obtaining at least one second user according to the position information, wherein the second user is within a first user's user relationship chain, and wherein the information published in the past by the second user includes the position information; and displaying the at least one second user to the first user. The present disclosure makes the first user learn of the friends who published at this position information, and therefore the amount of the information available at this position has increased, thus enriching the first user's knowledge of the need for detailed information.

23 Claims, 9 Drawing Sheets

(58) Field of Classification Search
USPC .... 455/412.1–422.1, 456.1–457, 552.1, 566, 455/550.2, 41.1–41.3; 370/328, 338
See application file for complete search history.

(56) References Cited

U.S. PATENT DOCUMENTS

| | | | | |
|---|---|---|---|---|
| 2009/0156234 | A1* | 6/2009 | Sako | G01C 21/3614 455/456.3 |
| 2010/0030465 | A1* | 2/2010 | Solkesz | G01C 21/20 701/533 |
| 2010/0179754 | A1* | 7/2010 | Faenger | G06F 17/3087 701/532 |
| 2012/0095979 | A1* | 4/2012 | Aftab | G06F 17/30867 707/706 |
| 2012/0143963 | A1* | 6/2012 | Kennberg | G06Q 10/107 709/206 |
| 2012/0158611 | A1* | 6/2012 | Pulito | G06Q 10/10 705/347 |
| 2012/0302256 | A1* | 11/2012 | Pai | H04W 4/02 455/456.2 |
| 2012/0316963 | A1* | 12/2012 | Moshfeghi | G06Q 20/20 705/14.58 |
| 2013/0293584 | A1* | 11/2013 | Anderson | G06T 11/00 345/633 |
| 2014/0057657 | A1* | 2/2014 | Manber | G01C 21/3644 455/456.3 |
| 2014/0164121 | A1* | 6/2014 | Payne | G06Q 30/0207 705/14.58 |

FOREIGN PATENT DOCUMENTS

| | | |
|---|---|---|
| CN | 102902810 A | 1/2013 |
| CN | 102968421 A | 3/2013 |
| CN | 103096242 A | 5/2013 |
| CN | 103327041 A | 9/2013 |
| CN | 103400291 A | 11/2013 |
| CN | 104252518 A | 12/2014 |

OTHER PUBLICATIONS

First Written Opinion to Chinese Appln. No. 201410092964.3, dated Mar. 13, 2014, (7p).

Second Written Opinion to Chinese Appln. No. 201410092964.3, dated Oct. 10, 2015, (5p).

* cited by examiner

METHOD AND DEVICE FOR DISPLAYING INFORMATION WHICH LINKS TO RELATED INFORMATION PROVIDED BY USER'S FRIENDS AT USER'S LOCATION

CROSS-REFERENCE TO RELATED APPLICATIONS

The application is a continuation of PCT/CN2015/070483, filed on Jan. 9, 2015 and titled "METHOD AND DEVICE FOR DISPLAYING INFORMATION WHICH LINKS TO RELATED INFORMATION PROVIDED BY USER'S FRIENDS AT USER'S LOCATION", which claims priority to Chinese Patent Application No. 2014100929643, filed on Mar. 13, 2014, which is incorporated by reference in their entirety.

FIELD OF THE TECHNOLOGY

The present disclosure relates to internet technology field, and more particularly to a method and device for displaying information which links to related information provided by user's friends at user's location.

BACKGROUND

With the rapid development of Internet technology and location positioning technology, mobile terminals are used by users to post or publish multimedia information such as texts, pictures or videos and the like on social information displaying platform (e.g., Facebook, Weibo, QQ, to name a few). An information displaying server may obtain the physical location information of the mobile terminal according to the location positioning information of the mobile terminal. The published information may include the location information so that other users or readers may learn of the location where the user publishes or posts the information when browsing the information.

However, the location information published by the information displaying server may include only a name of the position where the terminal is located, such as: the name of the street or the name of a restaurant where the mobile terminal is located. Therefore, the information received by the users may be inadequate and not detail enough for the users to know about the location and may not satisfy the users' further needs to have detailed information.

SUMMARY

In order to solve the problems existing in the prior art, the present disclosure provides a method and a device for displaying information which links to related information provided by user's friends at user's location.

A first embodiment discloses a method for displaying information which links to related information provided by user's friends at user's location. The method including at least the following operations: obtaining first user's information viewing operation performed on information associated with the first user; obtaining position information included in the information; obtaining at least one second user according to the position information, wherein the second user is within a first user's user relationship chain, and wherein the information published in the past by the second user includes the position information; and displaying the at least one second user to the first user.

A second embodiment discloses a method for displaying information which links to related information provided by user's friends at user's location, the method include the following exemplary operations: obtaining information viewing operation performed on the at least one second user; sending an information viewing request to the server such that the server looks up returned information which includes the position information among the information published in the past by the at least one second user; and displaying the information which includes the position information.

A third embodiment discloses a device for displaying information which includes at least a processor with circuitry operating in conjunction with at least a memory storing codes to be executed to request to perform functions as a plurality of modules, wherein the plurality of modules include: an information viewing operation obtaining module, which causes the device to obtain first user's information viewing operation performed on information associated with the first user; a position information obtaining module, which causes the device to obtain position information included in the information; a second user obtaining module, which causes the device to obtain at least one second user according to the position information, wherein the second user is within a first user's user relationship chain, and wherein the information published in the past by the second user includes the position information; and a displaying module, which causes the device to display the at least one second user to the first user.

A fourth embodiment discloses a device which links to related information provided by user's friends at user's location, the device includes at least a processor with circuitry operating in conjunction with at least a memory storing codes to be executed to request to perform functions as a plurality of modules, wherein the plurality of modules include: a first viewing operation obtaining module, which causes the device to obtain first user's information viewing operation performed on the information associated with the first user; a position information obtaining module, which causes the device to obtain position information included in the information; a displaying request sending module, which causes the device to send the information displaying request to a server, wherein the information displaying request carries the position information and the displaying request sending module causes the server to return at least one second user according to the position information, wherein the second user is within a first user's user relationship chain, and wherein the information published in the past by the second user includes the position information; and a displaying module, which causes the device to display at least one second user returned by the server.

The technical solutions provided by the embodiments of the present disclosure may bring benefits, such as enabling the first user to link to and browse from other friends who in the past may have visited the same location and may have left published information or comments regarding their experience or information of such visits for others to review. Accordingly, the additional information linked to this location may provide further details to help the first user, who may be a consumer to make a better informed decision before using the service or to endorse the service with a positive experience for friends who may utilize the service in the future.

BRIEF DESCRIPTION OF THE DRAWINGS

To explain the technical solutions of the embodiments of the present disclosure, accompanying drawings used in the embodiments are followed. Apparently, the following drawings merely illustrate some embodiments of the disclosure, but for persons skilled in the art, other drawings may be obtained without creative works according to these drawings.

DETAILED DESCRIPTION OF ILLUSTRATED EMBODIMENTS

The various embodiments of the disclosure may be further described in details in combination with attached drawings and embodiments below. It should be understood that the specific embodiments described here may be used only to explain the disclosure, and may not be used to limit the disclosure. In addition, for the sake of keeping description brief and concise, the newly added features, or features which may be different from those previously described in each new embodiment will be described in details. Similar features may be referenced back to the prior descriptions in a prior numbered drawing or referenced ahead to a higher numbered drawing. Unless otherwise specified, all technical and scientific terms herein may have the same meanings as understood by a person skilled in the art.

Hardware device executing environments related in the embodiments of the present disclosure may be mobile phones, tablet PCs and other mobile terminals which may implement the method using a mobile terminal's browser.

Figure 1:
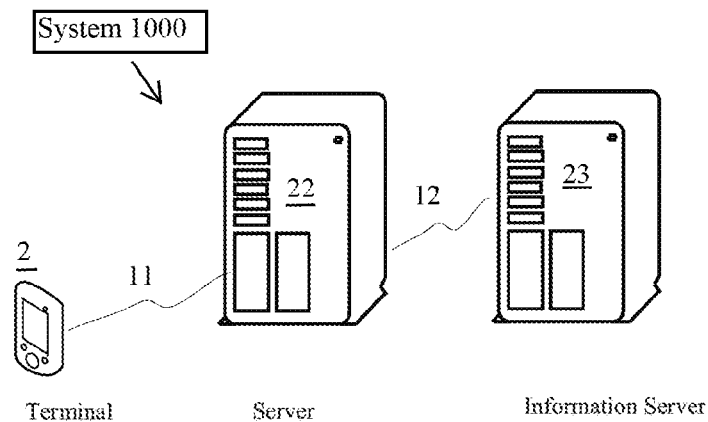
FIG. 1 is an exemplary structural schematic diagram of the system for displaying information which links to related information provided by user's friends at user's location according to one embodiment of the present disclosure.

FIG. 1 is a structural schematic diagram of a system (1000) for displaying information which links to related information provided by user's friends at user's location according to one embodiment of the present disclosure. As shown in FIG. 1, the system (1000) for displaying information which links to related information provided by user's friends at user's location may include a terminal (21), a server (22) and an information server (23).

The terminal (21) and the server (22) may be connected via an Internet (11), the server (22) and the information server (23) may be connected through an interface (12). The terminal (21) may be used for obtaining a first user's information viewing operation performed on the information associated with the first user, and obtaining position information which may be included in the information, then sending an information displaying request which may carry the position information. The server (22) may be used for obtaining at least one second user according to the position information, wherein the second user may be within the first user's user relationship chain and the information may have be published in the past by the second user to include the position information.

In addition, the terminal (21) may also be used for displaying at least one second user. The information server (23) may be used for collecting description information which corresponds to every piece of position information. Thus the server (22) may call the interface (12) between the information server (23) and the server (22) itself, and the description information which corresponds to every piece of position information may be obtained.

Figure 2:
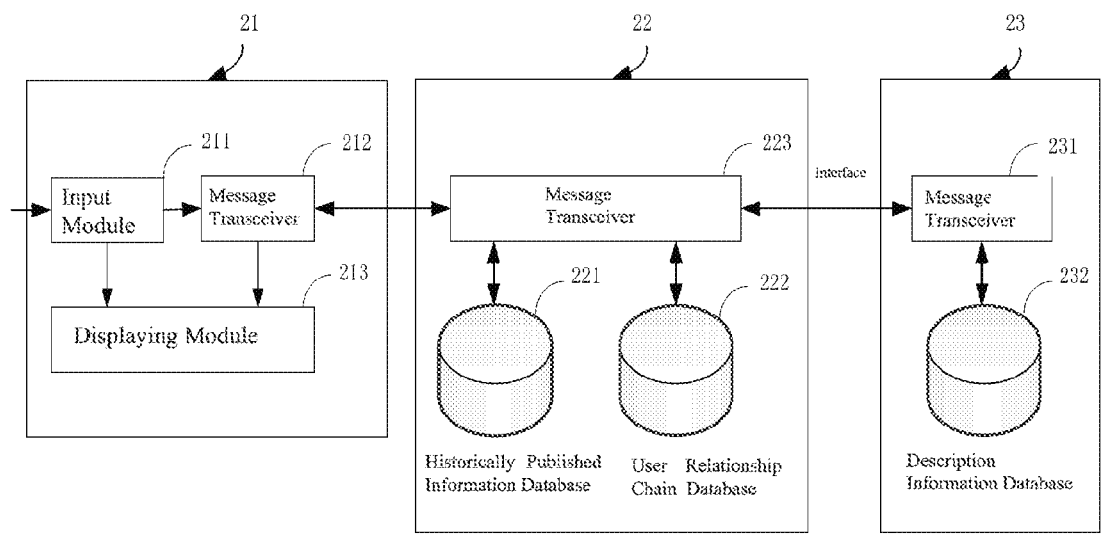
FIG. 2 is an exemplary schematic diagram which shows the components of the system for displaying information which links to related information provided by user's friends at user's location according to one embodiment of the present disclosure.

FIG. 2 is an exemplary schematic diagram which shows exemplary components of the system (1000) for displaying information which links to related information provided by user's friends at user's location, according to one embodiment of the present disclosure. Referring to FIG. 2, the following description of each component of the system may be given.

1) Terminal (21) may include an input module (211), a message transceiver (212), and a displaying module (213).

The input module (211) may be used for obtaining a user's key operation, such as a screen touching operation or a sliding operation performed on the terminal (21). The input module (211) may also be used for obtaining a first user's information viewing operation performed on the information associated with the first user as well as an information viewing operation performed on at least one second user.

The message transceiver (212) may be used for sending information displaying request and an information viewing request to the server (22). The message transceiver (212) may also be used for receiving the at least one second user sent by the server (22), the information may include location or position information as well as description information which corresponds to the position information. Such location or position information may include but not limited to at least one of: GPS coordinates, satellite map location view, street address, name of business or commonly known point of interest name (such as a landmark), to name a few.

The displaying module (213) may be used for displaying the at least one second user. The information may include the position information as well as the description information which corresponds to the position information. Such description information may include blogs, comments, recommendations or reviews posted by an individual user regarding his or her experience as information which corresponds to the location or position information.

2) The server (22) may include an archive of historically published information database (221), a user relationship chain database (222) and a message transceiver (223).

The archive of historically published information database (221) may be used for storing the information published in the past by every user and the review information corresponding to the information. The user relationship chain database (222) may be used for storing the user relationship chain of every user. The message transceiver (223) may be used for receiving the information displaying request and information viewing request sent by the terminal (21). The message transceiver (223) may also be used for sending to the terminal (21) at least one second user along with the at least one second user's position information and related information description such as a review which correspond to the position information. Furthermore, the message transceiver (223) may also be used for receiving the description information sent by the information server (23) via the interface between the message transceiver (223) and the information server (23).

3) The information server (23) may include a message transceiver 231 and a description information database (232). The description information database (232) may be used for storing the description information which corresponds to every piece of position information. The message transceiver (231) may be used for obtaining the description information from the description information database (232), and then sending the description information to the server (23). The message transceiver (231) may also be used for receiving uploaded description information which corresponds to every piece of position information, afterwards storing the received uploaded description information into the description information database (232).

Figure 3:
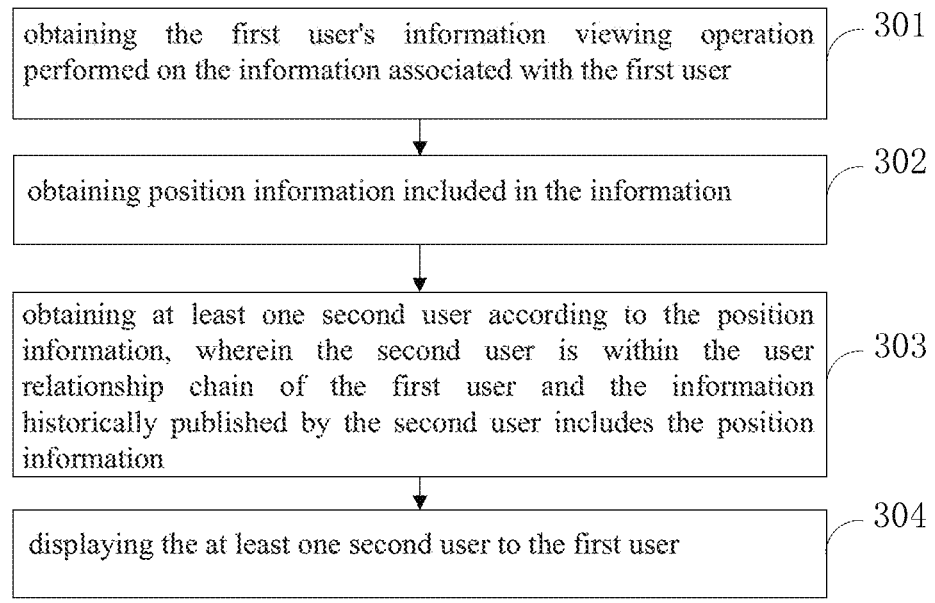
FIG. 3 is a flowchart illustrating a method for displaying information which links to related information provided by user's friends at user's location according to one embodiment of the present disclosure.

FIG. 3 is an exemplary flowchart of the method for displaying information which links to related information provided by user's friends at user's location according to one embodiment of the present disclosure. As shown in FIG. 3, the method may include the following operations:

301: obtaining the first user's information viewing operation performed on the information associated with the first user;

302: obtaining position information included in the information;

303: obtaining at least one second user according to the position information, wherein the second user is within a user relationship chain of the first user and the information published in the past by the second user includes the position information;

304: displaying the at least one second user to the first user.

The method provided by this embodiment enables the first user to find out more detail information of this same position information (e.g., products, services provided by the business at this location, or comments on the experience of visiting the landmark at this location) through the published information of other friends. Thus improving the first user's experience and providing helpful detailed information to other mutual friends in the user relationship chain.

In another embodiment, after the displaying of the at least one second user to the first user, the method further include the operations of: looking up the information which includes the position information from among the information published in the past by the at least one second user; and displaying the information which includes the position information.

In another embodiment, before obtaining the information viewing operation performed on the information associated with the first user, the method further include the operations of: obtaining information publishing operation of the first user, wherein the information which corresponds to the information publishing operation includes the position information.

In an embodiment, the obtaining of the information publishing operation of the first user include: obtaining geographical location information of the first user or the information publishing operation; obtaining at least one piece of alternative position information which corresponds to the geographical location information according to the geographical location information; and determining the at least one piece of alternative position information as the position information.

In an embodiment, the obtaining of the at least one second user according to the position information, include the operations of: determining a third user who publishes the position information; obtaining a fourth user who is included both in the first user's user relationship chain and the third user's user relationship chain; and obtaining the at least one second user from the obtained fourth user according to the position information.

In an embodiment, the method further include the operations of: calling an interface between an information server and a server, obtaining description information which corresponds to the position information from the information server, wherein the information server is used for collecting description information corresponding to every position information.

In an embodiment, the description information includes at least one piece of address information, contact information, review information, evaluation rating, and activity information of the position and the map of the district where the position is located.

In an embodiment, the information associated with the first user is the information published by the first user or the information published by the user in the first user's user relationship chain.

The technical solutions mentioned above may be arbitrarily combined to form the preferable embodiments of the present disclosure, which would not be repeated here.

Figure 4:
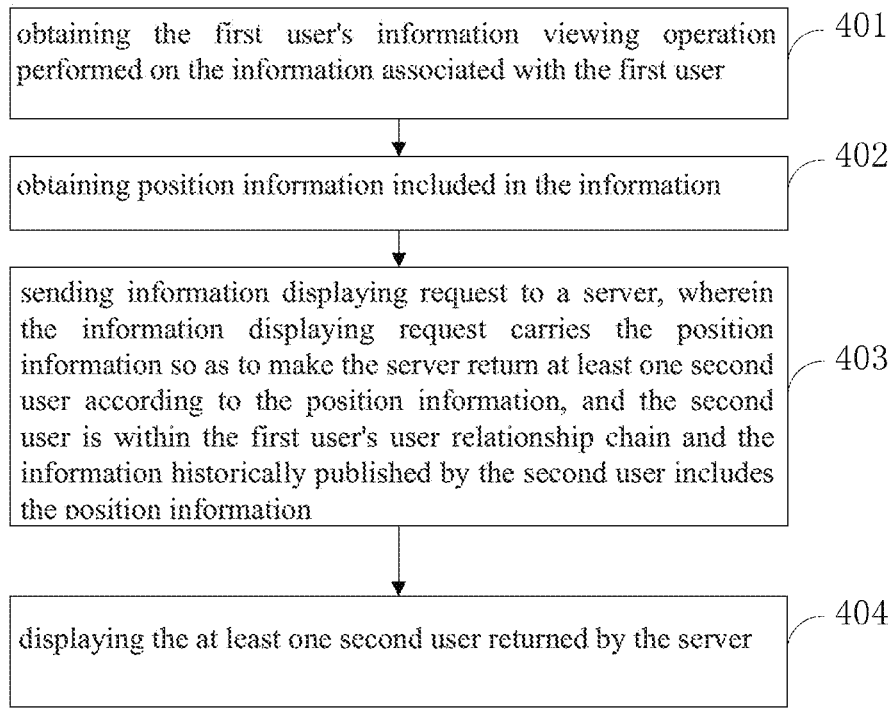
FIG. 4 is a flowchart illustrating a method for displaying information which links to related information provided by user's friends at user's location according to one embodiment of the present disclosure.

FIG. 4 is an exemplary flowchart of the method for displaying information which links to related information provided by user's friends at user's location according to one embodiment of the present disclosure, and the executing body in this embodiment is a terminal (such as terminal (21) in FIG. 1). As shown in FIG. 4, the method include at least the following operations:

401: obtaining first user's information viewing operation performed on the information associated with the first user;

402: obtaining position information included in the information;

403: sending information displaying request to a server (such as server (22) in FIG. 1), wherein the information displaying request carries the position information such that the server returns at least one second user according to the position information, wherein the second user is within a first user's user relationship chain, and wherein the information published in the past by the second user includes the position information; and

404: displaying the at least one second user returned by the server.

In the method provided by this embodiment, by using the following method: when obtaining the first user's information viewing operation performed on the information associated with the first user, obtain position information included in the information and send information displaying request to the server such that the server obtain at least one second user and return it to the terminal, then the terminal displays the at least one second user, wherein the second user is within the first user's user relationship chain and the information published in the past by the second user includes the position information, thus the first user may benefit from learning first hand through his or her friends who in the past have visited the same location and have published information corresponding to this same position information.

In an embodiment, after the displaying of the at least one second user returned by the server, the method further include the operations of: obtaining information viewing operation performed on the at least one second user; sending an information viewing request to the server such that the server looks up returned information which includes the position information among the information published in the past by the at least one second user; and displaying the information which includes the position information.

In an embodiment, before obtaining the information viewing operation performed on the information associated with the first user, the method further include the operation of: obtaining information publishing operation of the first user, wherein the information which corresponds to the information publishing operation includes the position information.

In an embodiment, the obtaining of information publishing operation of the first user, includes the operations of: obtaining geographical location information of the first user or the information publishing operation; obtaining at least one piece of alternative position information which corresponds to the geographical location information according to the geographical location information; and determining the at least one piece of alternative position information as the position information.

In an embodiment, the method further include the operations of: obtaining description information which corresponds to the position information sent by the server, wherein the description information is obtained by the server's operation of calling the interface between information server (such as information server (23) in FIG. 1) and the server itself, wherein the information server is used for collecting description information corresponding to every position information.

In an embodiment, the description information includes at least one or more of: address information, contact information, review information, evaluation rating, and activity information of the position and the map of the district where the position is located.

In an embodiment, the information associated with the first user is the information published by the first user or the information published by the user in the first user's user relationship chain.

The technical solutions mentioned above may be arbitrarily combined to form the preferable embodiments of the present disclosure, which would not be repeated here.

Figure 5:
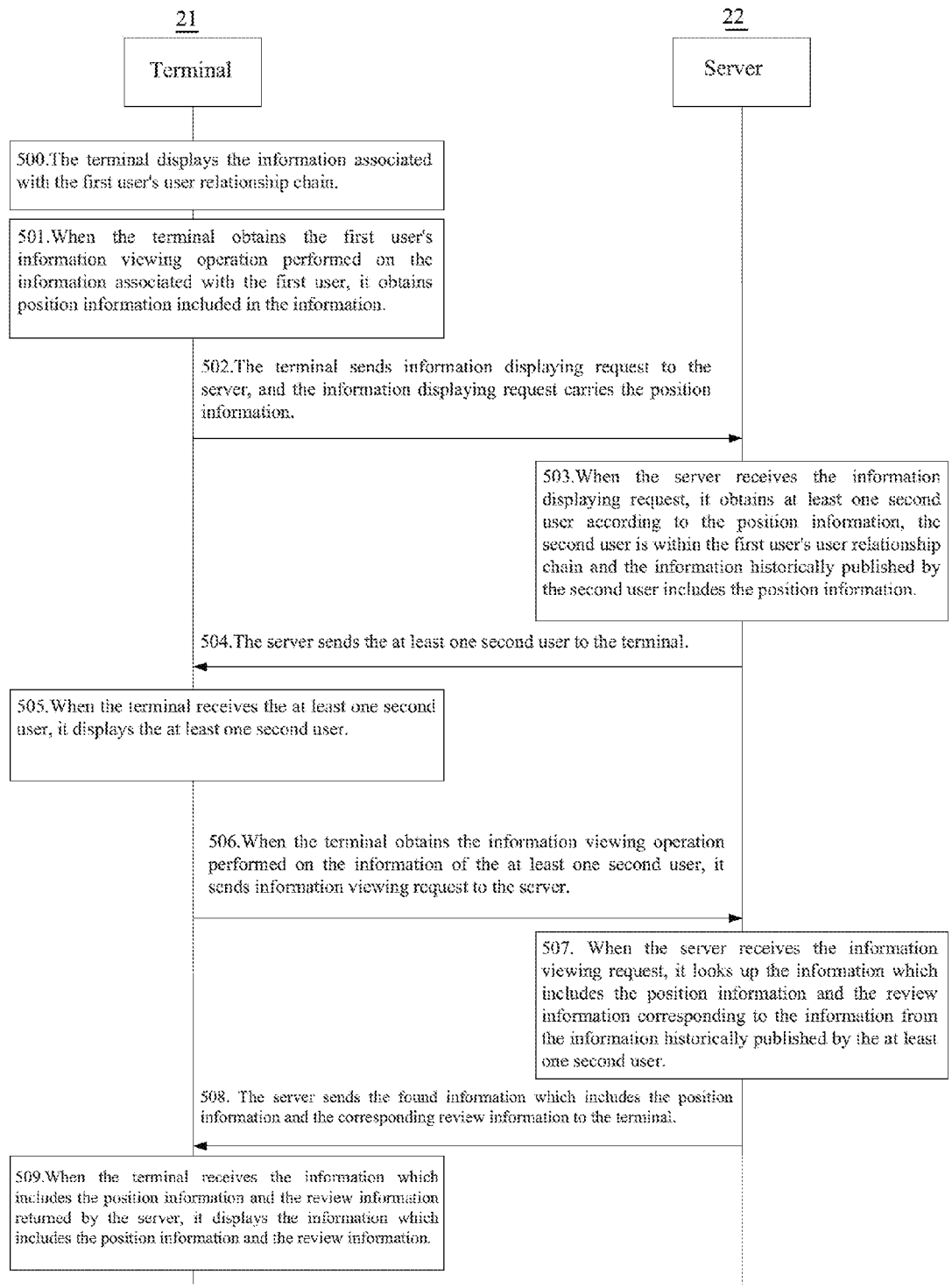
FIG. 5 is a flowchart of the method for displaying information which links to related information provided by user's friends at user's location according to another embodiment of the present disclosure.

FIG. 5 is an exemplary flowchart of the method for displaying information which links to related information provided by user's friends at user's location according to one embodiment of the present disclosure, and the interaction bodies in this embodiment are a terminal (21) and a server (22). The terminal (21) in FIGS. 6a-6e may also be used to provide description to illustrate the method steps described in FIG. 5. The method includes at least the following operations:

500: The terminal (21) may display on a browser of the terminal, information associated with the first user's user relationship chain. The terminal (21) in this embodiment may be a smart phone, a wireless communication tablet, a laptop personal computer, a notepad computer, or any device which may be capable of connecting to a network. The first user may use the terminal (21) to login to the server based on an account created, which for example, may be a telephone number of the first user.

In this embodiment, the server may provide an information displaying platform to be used by each user to publish information, and the server may also be used to maintain each user's user relationship chain (which would include at least one additional user in the chain). For the first user, the server may provide the information associated with the first user to the first user, while the terminal may display this information.

The information associated with the first user may be the information published by the first user or the user in the first user's user relationship chain. Further, the published information may include the first user's position information, text information, picture information, video information, audio information and the like, which is not limiting in this embodiment. Position information (shown as map marker (27)) may be used for showing the publishers' position or geographical location. More specifically, the position information (27) may be provided through a global positioning system (GPS) receiver with a navigation application installed within the terminal (21), and the positioning information may be displayed as one or more of: GPS coordinates, a position marker of a local map location which shows the street address, name of the business, or a name of the Point of Interest (POI) provided by the server (23). The user may therefore, publish or broadcast his or her position information in order to search and identify other users in the user relationship chain of the user in order to learn more information made by other users regarding the published or broadcasted position information.

501: When the terminal (21) obtains a first user's information viewing operation performed on the information associated with the first user, the terminal may obtain position information (27) (i.e., via the GPS receiver and the navigation application) which may be included within the information which is to be viewed during the viewing operation.

The information viewing operation may be trigged by the first user's clicking an operation to be performed on any piece of information associated with the first user or any piece of position information among the information associated with the first user, which is not limited in this embodiment.

In brief, when the terminal (21) obtains the first user's clicking operation performed on the information associated with the first user, the terminal first obtains the position information which corresponds to the clicking operation in order to subsequently display the information corresponding to the position information.

Figure 6A:
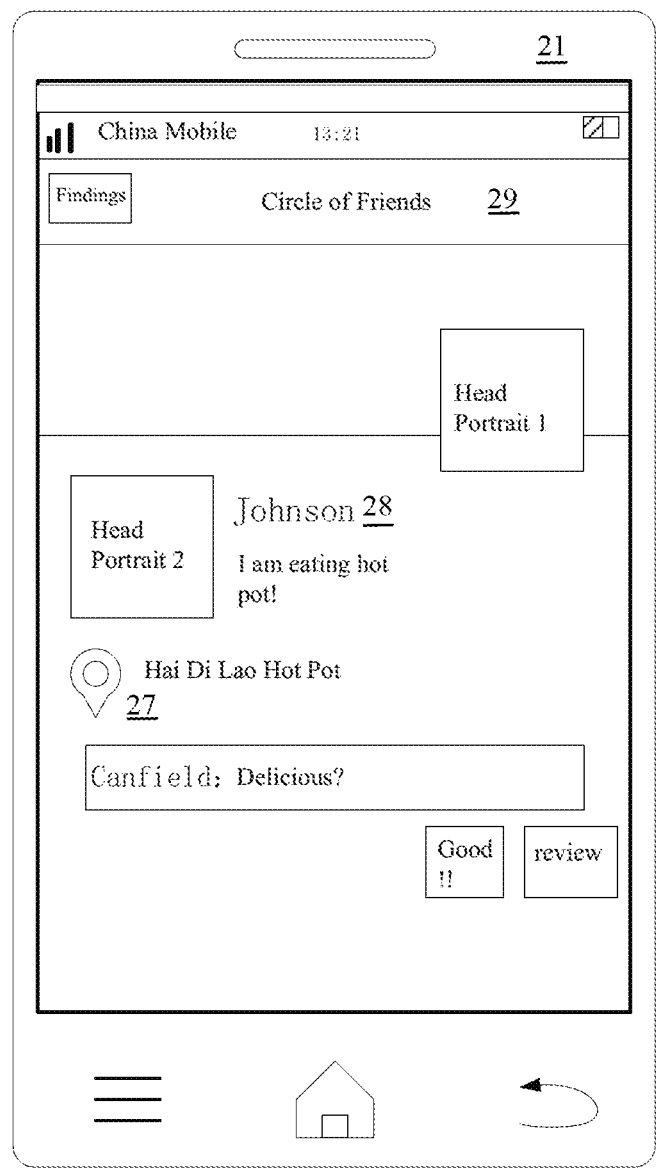
FIG. 6a is an exemplary schematic diagram which shows information displaying according to one embodiment of the present disclosure.

Referring to FIG. 6a, the terminal (21) may displays the information associated with the first user (28) (e.g., the user "Johnson") who may publish or broadcast a piece of information (e.g., I am eating hot pot!) which may include the position information (27) (shown as a position marker on a map location) which a restaurant is located and doing business under the name of "Hai Di Lao Hot Pot". The terminal (21) may respond to the first user's clicking operation performed on the position information (27) (i.e., the restaurant "Hai Di Lao Hot Pot") by obtaining more related information on this position information (27) from other users who had been to the same position information, i.e., in this case, as customers who had also eaten at the restaurant "Hai Di Lao Hot Pot".

More specifically, the first user (e.g., Johnson) may first trigger the viewing operation performed on the information (e.g., "I am eating hot pot") published by the first user (e.g., Johnson) in order to view the position information (27) published by the user himself.

Alternately, the first user (28) (e.g., Johnson) may trigger the viewing operation performed on the information published by the user in the first user's user relationship chain (29) (i.e., circle of family) in order to view the position information (27) published by the user himself in the user relationship chain (29). Of course, the information viewing operation may not be trigged until the first user has completed his publishing or broadcasting of the information (e.g., "I am eating hot pot"). In other words, before step 501 (e.g., obtaining position information (27)), the method may include a sub-step 501-1: the terminal obtaining the first user's information (e.g., "I am eating hot pot") publishing operation.

The terminal (21) may alternately obtain at least one alternative position information based on the position information of the first user. For example, when the terminal obtains the first user's information publishing operation, the terminal may obtain and send the terminal's geographical location or position information (27) to the server (22). The server (22) may then determine at least one piece of alternative position information within a preset area of the terminal according to the terminal's geographical location or position information and a network map, and the server may then send the geographical location or position information to the terminal. The terminal (21) may afterwards display the at least one piece of the alternative position information.

When the terminal obtains the first user's selecting operation performed on any piece of the alternative position information, the terminal may determine the position information corresponding to the selecting operation as the position information, and then the terminal may publish the position information (27). In addition, the network map may be set up by the server (22) in advance according to the geographical coordinates of multiple pieces of position information. The preset area may set the terminal as a center with a preset distance as a radius to form a circular region, which may be determined by the server in advance, and it is not limited in the embodiment.

Figure 6B:
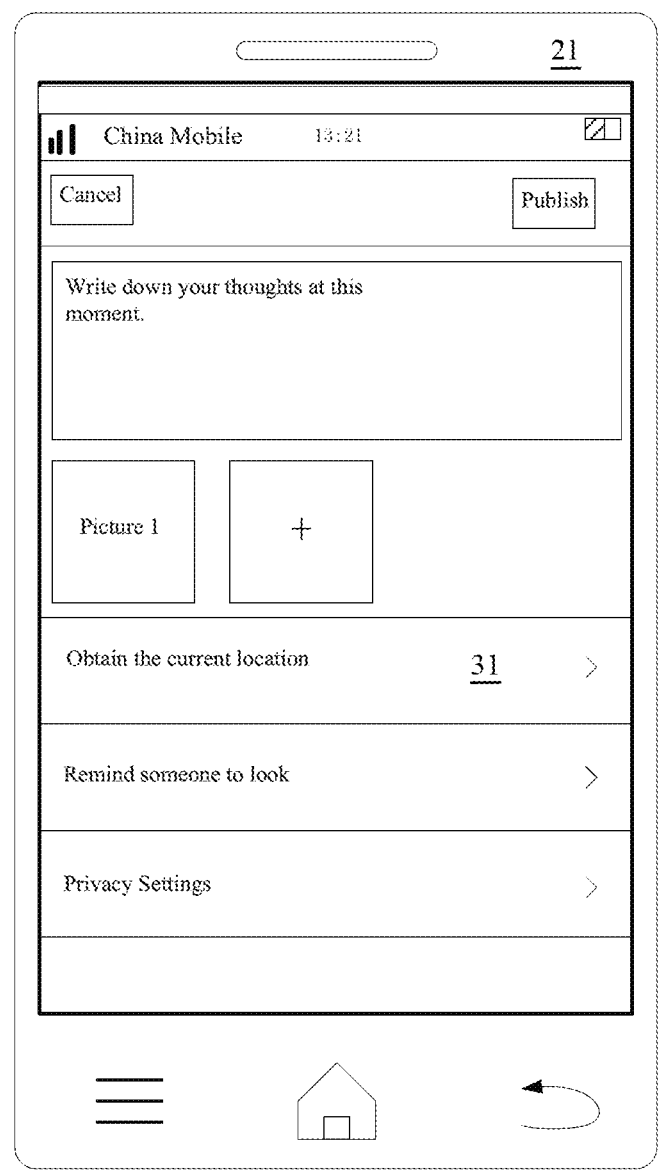
FIG. 6b is an exemplary schematic diagram which shows position information publishing according to one embodiment of the present disclosure.
Figure 6C:
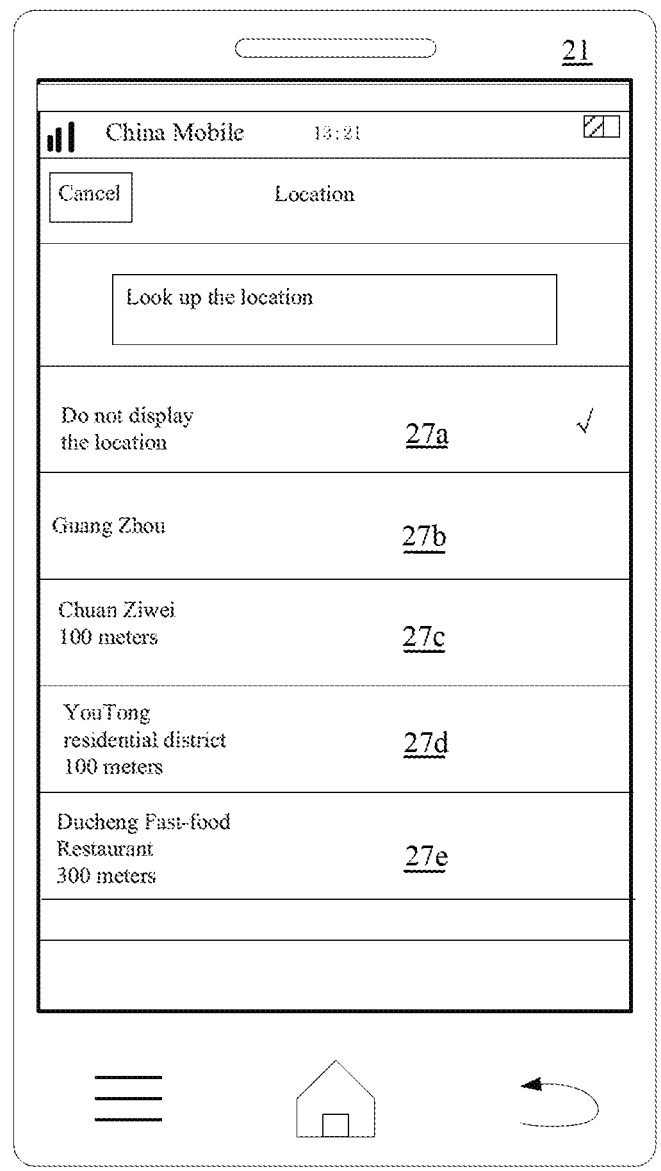
FIG. 6c is an exemplary schematic diagram which shows the alternative position information list according to one embodiment of the present disclosure.

Referring to FIG. 6b, a picture may be taken and published by the first user. The first user may have chosen "picture 1" to be published or broadcasted. Meanwhile, the terminal (21) may display an option of "obtaining the current position" (31). After the terminal receives a clicking operation performed on "obtaining the current position", the terminal may then obtain geographical location position information of the terminal and sends the position information to the server. The server (22) may determine at least one piece of alternative position information within 500 meters of the terminal according to the geographical location position information and the network map of the terminal, and the server may send the at least one piece of alternative position information to the terminal (21), when receiving the at least one piece of alternative position information, the terminal may display the alternative position information list (27a to 27e) as shown in FIG. 6c, and the first user may select one piece of position information to publish from the alternative position information list (27a to 27e).

It should be pointed out that in order for the information (e.g., I am eating hot pot!) to be published by the first user (28) (e.g., Johnson), the step that the terminal obtains the information viewing operation should be executed only after the step that the terminal obtains the first user's information publishing operation, even though it may not be necessary to be executed directly right after the step that the terminal obtains the first user's information publishing operation. In other words, step 501 (performing information viewing operation) may be executed so long as step 501-1 is first executed (the first user's information publishing operation), and how soon after is not limiting.

502: The terminal (21) may send an information displaying request to the server (22), wherein the information displaying request may carry the position information.

503: When the server (22) receives the information displaying request, the server may obtain at least one second user according to the position information (27) of the first user, wherein the second user may be within the first user's user relationship chain (29) (e.g., circle of friends), and wherein the information published in the past by the second user may include the same position information (27) of the first user's location.

In this embodiment, users in the user relationship chain (29) (e.g., circle of friends) may be friends, colleagues or relatives of the first user.

Taking the first user as an example, the first user may register under an account system provided by the server based on an account under the first user's telephone number (33). The server may set up the first user's user relationship chain (29) according to the first user's user adding operation according to the added contacts in the saved telephone list on the first user's smart phone or terminal. Specifically, the first user may request the server (22) to add other users. The server may directly add other users in the first user's user relationship chain (29), thus other users may become the first user's friends. Alternately, the server (22) may send the first user's adding request to other users, when the server confirms that other users have accepted this adding request, the server may add other users in the first user's user relationship chain, thus other users and the first user have become mutual friends.

In this embodiment, the server (22) may store the previously published information of each user. When the server may receive the information displaying request and obtain at least one second user who in the past may have published the information pertains to the same position information (27).

In an embodiment, step 503 may further include: the server (22) may obtain related information (e.g., "Delicious") published or broadcasted by each user in the first user's user relationship chain (29). As for each piece of related information (e.g., "Delicious"), the server may determine whether the related information (e.g., "Delicious") may include the position information (27) (e.g., "Hai Di Lao Hot Pot" restaurant).

When the related information (e.g., "Delicious") includes the position information (27) (e.g., "Hai Di Lao Hot Pot" restaurant), the user (e.g., Canfield) who at least in the past has published this related information may be determined as a "qualified second user" since the related information (e.g., "Delicious") and the first user's published or broadcasted information (e.g., "I am eating hot pot!") both share the same position information (27) (e.g., "Hai Di Lao Hot Pot" restaurant). As a result, the server (22) may send such "qualified second user" (e.g., Canfield) as the second user to the terminal (21). Accordingly, the first user (e.g., Johnson) may gain additional feedback or information on the business or point of interest he or she is visiting or has visited. Both the first user's information (e.g., "I am eating hot pot!") and the second user's related information (e.g., "Delicious") may be beneficial to other friends who may visit the business or point of interest located at the same position information (27) (e.g., "Hai Di Lao Hot Pot" restaurant).

In an embodiment, step 503 may also include the following steps:

(503-1): the server (22) may determine a third user (e.g., anyone of 27a to 27e in FIG. 6c) who may have published or broadcasted at the same position information (27). In this embodiment, when the terminal browses related information published by a third user (e.g., anyone of 27a to 27e in FIG. 6c), the position information (27) of the third user may trigger a request to display the position information (27). Thus the server (23) may determine who may be the third user (e.g., anyone of 27a to 27e in FIG. 6c) who in the past has published related information at the same position information (27) through such triggering of the request to display the position information (27).

(503-2): Obtaining a fourth user included in both the first user's user relationship chain and the third user's user relationship chain. The fourth user may be included in both the first user's user relationship chain and the third user's user relationship chain may be a mutual friend of the first user and the third user.

(503-3): Obtaining at least one second user from the obtained fourth user according to the position information. Specifically, the server may obtain the related information previously published by each fourth user. As for each piece of obtained related information, the server may determine whether the related information includes the same position information (27). When the related information includes the position information (27), the fourth user who published the related information may alternately be determined as being another qualified second user, thus the obtained at least one second user may be the user who came to this position or shared the position information before among the mutual friends or mutual users of the first and the second user.

It may be pointed out that the server may obtain the at least one second user from the first user's user relationship chain or from the users may be included in both the first user's user relationship chain and the third user's user relationship chain. Nevertheless, the users who are not included in the first user's user relationship chain (29) may be not sent to the terminal (21). Thus for a new user who has come to this location before, only a mutual friend of such new user may know that such new user has come to this location before, while other users who are not mutual friends of such new user may not know about it, hence, user's privacy may be maintained and has avoided unintended information leakage.

In the step 503, when the server receives the information displaying request, the server may obtain at least one second user and return the at least one second user to the terminal. In fact, the server (22) may obtain other relevant information of the position information to be returned to the terminal (21); the disclosure is not limited in the embodiment.

In an embodiment, this method may also include: the server (22) calls an interface (12) between the server (22) itself and the information server (23) to obtain description information which corresponds to the position information (27). The server (22) may send the description information to the terminal (21) to be displayed by the terminal (21). In addition, the description information may be used for describing the position information (27) corresponding to the description information. The description information may include at least one or more of: address information, contact information, review information, evaluation rating, activity information of the position information and the map of the district where the position information is located (see FIG. 6d).

In this embodiment, the information server (23) may be used for collecting description information which corresponds to each piece of position information (27). The address information, contact information and activity information of the position may be uploaded by an administrator, and the map of the district where the position is located may be generated by the information server (23) according to the position information (27) and the network map. The review information of the position may be uploaded by any user, as for the evaluation rating, any user may upload his own evaluation rating, and the information server may then collect and analyze the evaluation rating of every user and get a final evaluation rating of this position information (27) at the location.

504: The server (22) may send the at least one second user to the terminal (21). The server may have stored some basic information of each user, such as the head portrait information (see head portraits 2-4 in FIG. 6d), signature information and the like. So when the server sends the at least one second server to the terminal, the server may in fact, send the head portrait information and signature information of the at least one second user as well as the description information obtained by the server to the terminal.

505: When the terminal receives the at least one second user, the terminal may display the at least one second user or rather, the published information such as the picture of the user, comments, the ratings, the blogs made by the second user in the past pertaining to the location (e.g., "Hai Di Lao Hot Pot" restaurant).

Figure 6D:
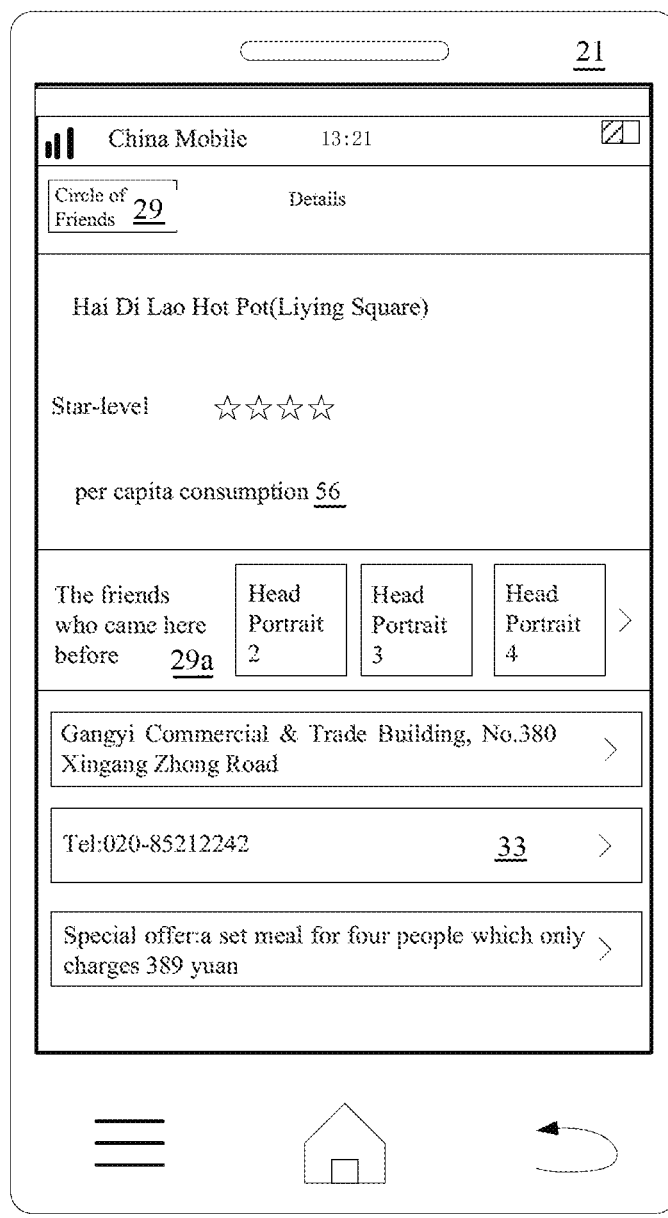
FIG. 6d is an exemplary schematic diagram which shows the information displaying page according to one embodiment of the present disclosure.
Figure 6E:
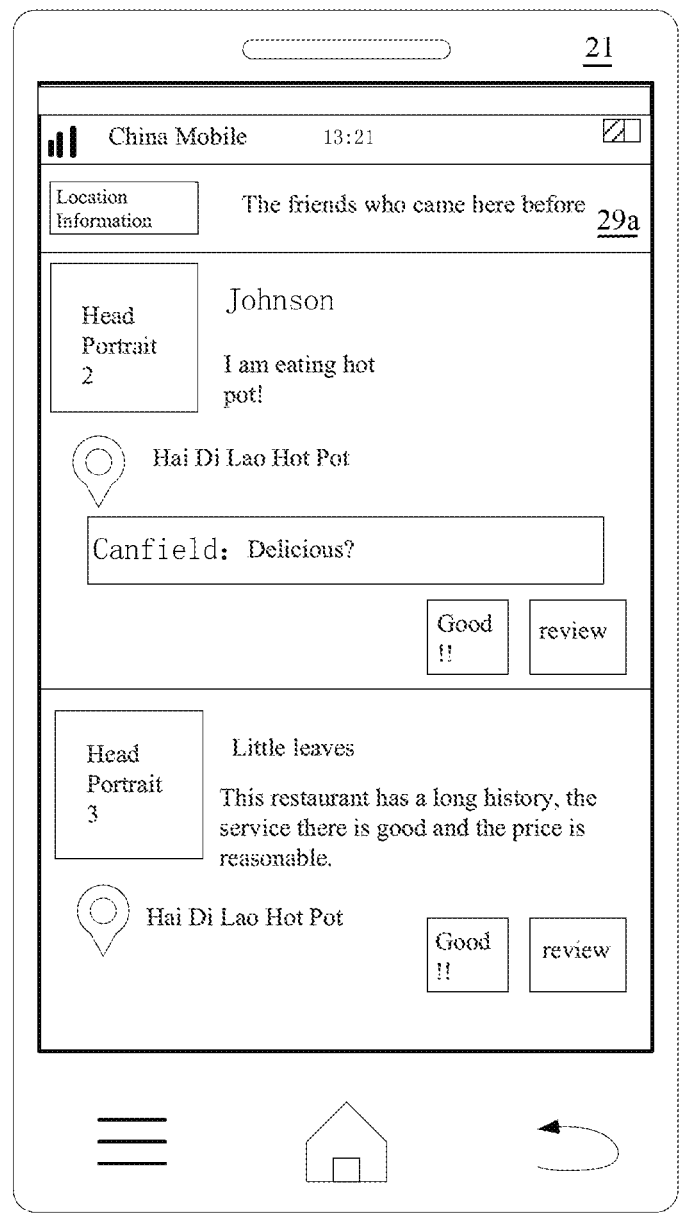
FIG. 6e is a schematic diagram which shows the information displaying page according to one embodiment of the present disclosure.

Alternately, when the terminal (21) receives the at least one second user (e.g., Canfield and Little Leaves in FIG. 6e), the terminal (21) may display the head portrait information of the at least one second user (see head portraits 2 and 3 in FIG. 6e). Further, when the terminal receives the at least one second user, the terminal may display the friends list (29a) (see FIG. 6e) including friends who came to the location before, where the head portrait information of the at least one second user (see head portraits 2 and 3 in FIG. 6e) may be displayed. In addition, when the terminal receives the description information which corresponds to the position information, the terminal may also display the description information (e.g., ratings, blogs, comments, per capita consumption statistics, etc.).

Referring to FIG. 6a, when the terminal (21) obtains a first user's clicking operation performed on the position information (27) ("Hai Di Lao Hot Pot" restaurant), an information displaying page (shown as in FIG. 6d) may displayed a "friends who came here before" option (29a) on the terminal (21). In the same embodiment, the first user (e.g., Johnson) may find out additional related information about the position information (27) ("Hai Di Lao Hot Pot" restaurant) through reading the priorly published description information on the displayed portrait information (e.g., head portraits 2-4 in FIG. 6d) of three second users in the "friends who came here before" option (29a). The terminal may further display more related description information of "Hai Di Lao Hot Pot" from the three second users, such as: a rating evaluation of "Hai Di Lao Hot Pot" (i.e., the location of the position information) being a four-star rating dining experience, per capita food consumption statistics of 56 Yuan (in Renminbi Chinese currency), physical address at "Gangyi Commercial & Trade Building, No. 380 Xingang Zhong Road", contact information (e.g., telephone number)

"020-85212242", activity information or event being "a set meal for four people which only charges 389 yuan", to name a few (see FIG. 6d).

In this embodiment, the at least one second user may be displayed by clicking the information associated with the first user or the position information in the information so that the first user may learn from the friends who in the past had come to this position, whose prior published event description information may share the same position information.

506: When the terminal (21) obtains the information viewing operation performed on the information of the at least one second user, it sends information viewing request to the server (22).

In an embodiment, the terminal may display the at least one second user (e.g., Canfield), when the first user (e.g., Johnson) wants to view related information which includes: the position information (27) published by the at least one second user. The first user may trigger the information viewing operation, when the terminal obtains the information viewing operation, it may send the information viewing request to the server (22). When the terminal displays the friends list (29), the information viewing operation may be triggered by the first user's clicking operation performed on the friend option. As shown in FIG. 6*d*, when the first user (e.g., Johnson) wants to view the related information which includes the position information (27) published by the at least one second user (e.g., Canfield), he may click the "friends who came here before" option (29*a*), when the terminal obtains the information viewing operation, it sends the information viewing request to the server (22).

In other embodiment, step 506 may be replaced by the following step: when the terminal (21) obtains the information viewing operation performed on the information of any second user, it sends the corresponding information viewing request to the server.

When the first user (e.g., Johnson) wants to view the information including the position information published by any second user, he (e.g., Johnson) may trigger the information viewing operation. After the terminal obtain the information viewing operation, the terminal (21) may send to the server (22) an information viewing request of the second user (e.g., Johnson) corresponding to the information viewing operation, such that the server may return the information corresponding to the information viewing operation which may include the position information (27) published in the past by the second user. Upon receiving, the first user (e.g., Johnson) may browse the related information and learn of the second user's (e.g., Canfield) activities or comments (e.g., "Delicious") at the same location or position information (27) ("Hai Di Lao Hot Pot" restaurant).

The information viewing operation performed on any second user may be triggered by the first user's clicking operation performed on the second user or by clicking the second user's portrait information.

507: When the server (22) receives the information viewing request, the server may look up the related information which may include the position information (27) and the review information corresponding to the information from the related information published in the past by the at least one second user.

As for each user, during publishing the related information, the server (22) may store the related information published in the past by each user, after publishing the related information, other users may add to the opinions of the related information. Of course, the server may store the publishing time of the related information, the publishing time of the review information, the users who publish the review information and the like.

Specifically, the information published in the past by every second user, whether it includes the position information or not should be determined, when the related information includes the position information, the related information and the corresponding review information will be extracted to send to the terminal. Of course, the server may look up the publishing time of the information, the publishing time of the review information and the users who publish the review information, afterwards, the server (22) may send the review information to the terminal (21).

Based on an alternate embodiment in step 506, step 507 may be replaced by the following step: when the server (22) receives the related information viewing request for any second user, and looks up the related information which may include: the position information (27) and the corresponding review information from the related information published by the second user (e.g., Canfield0 who corresponds to the information viewing request.

When the server (22) receives the information viewing request for any second user, the server (22) determines the second user who is corresponding to the information viewing request, as for the related information published by the second user (Canfield), whether the related information includes the position information (27) or not should be determined, when the related information includes the position information (27), the related information and the corresponding review information will be extracted to send to the terminal (21).

It needs to be mentioned that in this step 503, when the server (22) receives the information displaying request, the server may obtain the at least one second user (e.g., Canfield). In this step 507, when the server receives the information displaying request, the server may look up the related information which includes the position information (27). But during the actual application process, the server may look up the related information which includes the position information (27) while obtaining the at least one second user, and send the related information which includes the position information published by the at least one second user (e.g., Canfield) and every second user to the terminal.

Specifically, when the server receives the information displaying request, it obtains the related information published by every user in the first user's user relationship chain, as for the obtained information, the server may determine whether the related information includes the position information, when the related information includes the position information, the server regards the user who published this information as the second user and extracts the related information which includes the position information. The server may send the second user and the related information to the terminal, thus the terminal may display the at least one of the second user first, when obtaining the information viewing operation, the terminal may still displays the related information which includes the position information published by the at least one second user, or the server may send the determined second user to the terminal first, when receiving the information request, the server selects the related information published by the at least one second user from the extracted information and then sends it to the terminal (21).

508: The server (22) may send the found related information which may include the position information and the corresponding review information to the terminal (21).

509: When the terminal (21) receives the information which includes the position information and the review information returned by the server (22), the terminal (21) may display the information which may include the position information and the review information.

In an embodiment, when the terminal (21) receives the related information which includes the position information and the review information returned by the server, the terminal may display the related information which includes the position information (27) and the review information in the information displaying page according to the publishing time. Alternately, when the terminal receives the related information which includes the position information (27) and the corresponding review information returned by the server, the terminal may obtain the time for the last contact between the first user and every second user, then the terminal may display the related information which includes the position information (27) and the corresponding review information in the information displaying page according to the time for the last contact.

Referring to FIG. 6d, when the terminal (21) obtains the user's clicking operation performed on "friends who came here before" (29a), the terminal may display the information displaying page shown in FIG. 6e. In this information displaying page, the terminal may display the related information which may include the position information (27) and the review information corresponding to this information published by the first user's friends (29a) who came to this position or shared the position information before.

In this embodiment, the related information which includes the position information published by the at least one second user may be brought together to be displayed on the information displaying page. Thus the first user may browse the information related to the position information which may be published by the friends, and browse the corresponding review information, which increases the amount of the related information in this location position information, and makes the first user know more about the location position information.

Figure 7:
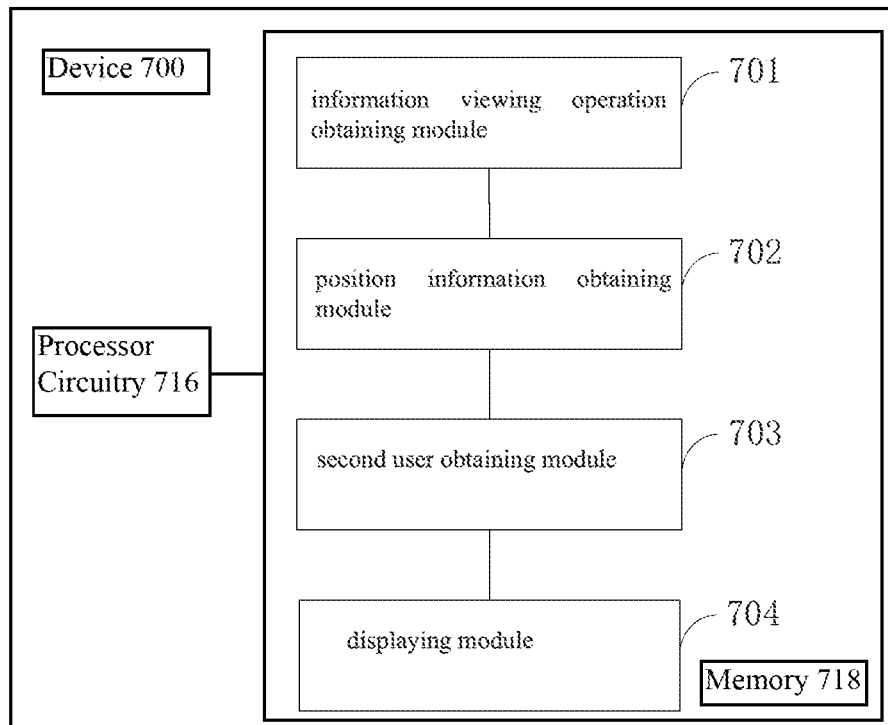
FIG. 7 is an exemplary structural schematic diagram of the device for displaying information which links to related information provided by user's friends at user's location according to one embodiment of the present disclosure.

FIG. 7 is an exemplary structural schematic diagram of a device (700) for displaying information which links to related information provided by user's friends at user's location, according to an embodiment of the present disclosure, as shown in FIG. 7, the device (700) includes: at least a processor with circuitry (716) operating in conjunction with at least a memory (718) storing codes to be executed to perform functions as a plurality of modules, wherein the plurality of modules include:

an information viewing operation obtaining module (701), which causes the device (700) to obtain first user's information viewing operation performed on information associated with the first user;

a position information obtaining module (702), which causes the device (700) to obtain position information included in the information, which is connected with the information viewing operation obtaining module (701);

a second user obtaining module (703), which causes the device (700) to obtain at least one second user according to the position information, which is connected with the position information obtaining module (702), wherein the second user is within a first user's user relationship chain, and wherein the information published in the past by the second user includes the position information; and a displaying module (704), which causes the device (700) to display the at least one second user to the first user, which is connected with the second user obtaining module (703).

By using the device provided in this embodiment, when obtaining the first user's information viewing operation performed on the information associated with the first user, at least one second user may be obtained according to the position information, wherein the second user is within the first user's user relationship chain and the related information published in the past by the second user includes the position information, thus the first user may learn the friends who published this position information, and the amount of the related information in this position has increased, which makes the first user know more about the location, furthermore, the position information become more detailed, which satisfies the first user's need for detailed information.

Alternately, the device (700) further includes: an information looking up module, which causes the device to look up information which includes the position information among the information published in the past by the at least one second user; and an information displaying module, which causes the device to display the information which includes the position information.

Alternately, the device further includes: a publishing operation obtaining module, which causes the device to obtain information publishing operation of the first user, wherein the information which corresponds to the information publishing operation includes the position information.

Alternately, the publishing operation obtaining module includes: a geographical location information obtaining unit, which causes the device to obtain geographical location information of the first user or the information publishing operation; an alternative information obtaining unit, which causes the device to obtain at least one piece of alternative position information corresponding to the geographical location information according to the geographical location information; and a position information obtaining unit, which causes the device to determine at least one of the alternative position information as the position information.

Alternately, the second user obtaining module (703) includes: a third user determining unit, which causes the device to determine the third user who publishes the position information; a fourth user obtaining unit, which causes the device to obtain the fourth user included in both the first user's user relationship chain and the third user's user relationship chain; and a second user obtaining unit, which causes the device to obtain at least one second user from the obtained fourth user according to the position information.

Alternately, the device (700) further includes: a description information obtaining module, which causes the device to call an interface between an information server and a server, and obtain description information which corresponds to the position information from the information server, wherein the information server is used for collecting description information which corresponds to position information.

Alternately, the description information includes at least one or more of: address information, contact information, review information, evaluation rating, activity information of the position and the map of the district where the position is located.

Alternately, the information associated with the first user is the information published by the first user or the information published by the user in the first user's user relationship chain.

The technical solutions mentioned above may be arbitrarily combined to form the preferable embodiments of the present disclosure, which need not be repeated here.

Figure 8:
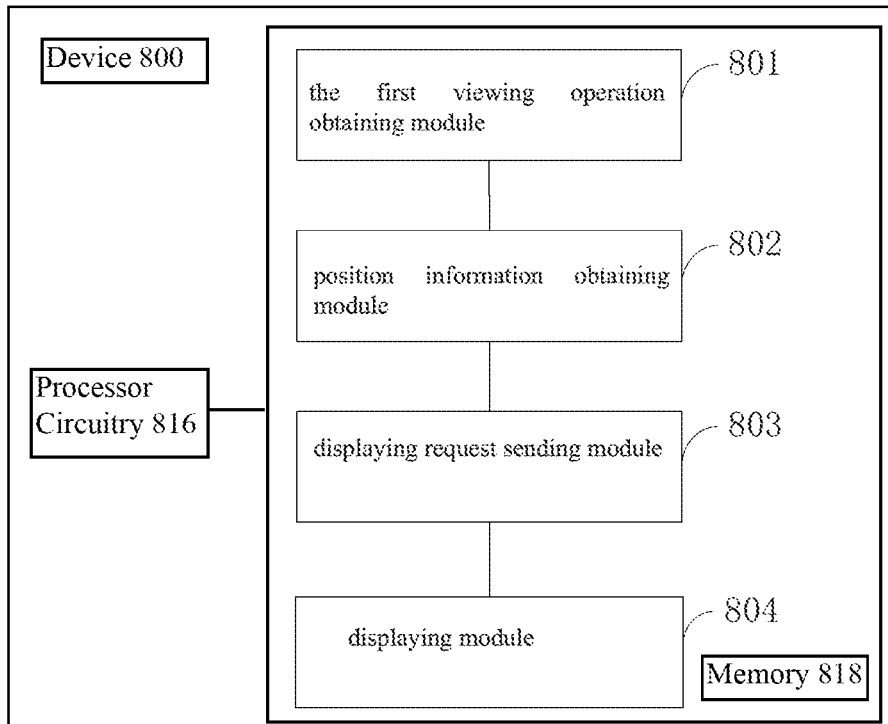
FIG. 8 is an exemplary structural schematic diagram of the device for displaying information which links to related information provided by user's friends at user's location according to one embodiment of the present disclosure.

FIG. 8 is an exemplary structural schematic diagram of a device (800) for displaying information which links to related information provided by user's friends at user's location according to one embodiment of the present disclosure. As shown in FIG. 8, the device (800) includes at least a processor with circuitry (816) operating in conjunction with at least a memory (818) storing codes to be executed to perform functions as a plurality of modules, wherein the plurality of modules include:

a first viewing operation obtaining module (801), which causes the device (800) to obtain first user's information viewing operation performed on the information associated with the first user;

a position information obtaining module (802), which causes the device (800) to obtain position information included in the information, the position information obtaining module (802) is connected to the first viewing operation obtaining module (801);

a displaying request sending module (803), which causes the device (800) to send the information displaying request to a server, wherein the information displaying request carries the position information and the displaying request sending module causes the server to return at least one second user according to the position information, wherein the second user is within a first user's user relationship chain, and wherein the information published in the past by the second user includes the position information, wherein the displaying request sending module (803) is connected to the position information obtaining module (802); and a displaying module (804), which causes the device (80)) to display at least one second user returned by the server, wherein the displaying module (804) is connected to the displaying request sending module (803).

By using the device provided in this embodiment, when the terminal obtains the first user's information viewing operation performed on the information associated with the first user, it obtains position information which is included in the related information and sends information displaying request to the server so as to make the server obtain at least one second user and return it to the terminal, and the terminal displays the at least one second user. The second user is within the first user's user relationship chain and the related information published in the past by the second user includes the position information, thus the first user may learn the friends who published this position information, and the amount of the related information in this position has increased, which makes the first user know more about the position, furthermore, the position information become more detailed, which satisfies the first user's need for detailed information.

Alternately, the device further includes: a second viewing operation obtaining module, which causes the device to obtain information viewing operation performed on the at least one second user; an viewing request sending module, which causes the device to send information viewing request to the server so as to make the server look up returned information which includes the position information among the information published in the past by the at least one second user; and an information displaying module, which causes the device to display the information which includes the position information.

Alternately, the device further includes: a publishing operation obtaining module, which causes the device to obtain information publishing operation of the first user, wherein the information which corresponds to the information publishing operation includes the position information.

Alternately, the publishing operation obtaining module includes: a geographical location information obtaining unit, which causes the device to obtain geographical location information of the first user or the information publishing operation; an alternative information obtaining unit, which causes the device to obtain at least one piece of alternative position information corresponding to the geographical location information according to the geographical location information; and a position information obtaining unit, which causes the device to determine at least one of the alternative position information as the position information.

Alternately, the device further includes: a description information obtaining module, which causes the device to obtain description information which corresponds to the position information sent by the server, wherein the description information is obtained by the server's operation of calling the interface between information server and the server itself, and the information server is used for collecting description information which corresponds to the position information; and a description information displaying module, which causes the device to display the description information.

Alternately, the description information includes one or more of: address information, contact information, review information, evaluation rating, activity information of the position and the map of the district where the position is located.

Alternately, the information associated with the first user is the information published by the first user or the information published by the user in the first user's user relationship chain.

The preferable technical solutions mentioned above may be arbitrarily combined to form the preferable embodiments of the present disclosure, which need not be repeated here.

It needs to be mentioned that the information displaying devices provided by the embodiments just provide some examples in using some divided function modules, in the practical application, the above-mentioned function may be accomplished by different function modules according to the needs, that is to say the internal structures of the terminal and the server may be divided into different function modules in order to accomplish all or part of the above-mentioned functions. In addition, the device and method for displaying information which links to related information provided by user's friends at user's location provided by the embodiments belong to the same conception, and the realization process may refer to the method embodiments, which is not repeated here.

The serial number of each embodiment of the present disclosure is only for description and is not intend to represent the merits of the corresponding embodiment. The sequence numbers of the above-mentioned embodiments may be intended only for description, instead of indicating the relative merits of the embodiments. It should be understood by those with ordinary skill in the art that all or some of the steps of the foregoing embodiments may be implemented by hardware, or software program codes stored on a non-transitory computer-readable storage medium with computer-executable commands stored within. For example, the disclosure may be implemented as an algorithm as codes stored in a program module or a system with multi-program-modules. The computer-readable storage medium may be, for example, nonvolatile memory such as compact disc, hard drive. ROM or flash memory. The computer-executable commands may enable a computer, a server, a smart phone, a tablet or any similar computing device to render operations which display information which links to related information provided by user's friends at user's location.

What is claimed is:

1. A method for displaying information which links to related information provided by user's friends at user's location, comprising:

obtaining first user's information viewing operation performed on information associated with the first user;

obtaining position information included in the information associated with the first user;

obtaining at least one second user according to the position information, wherein the second user is indirectly linked to the first user within a first user's user relationship chain in order to obtain related information published in the past by the second user pertaining to the position information; and displaying the at least one second user to the first user for obtaining related information published in the past by the second user according to a range of distance from the position information associated with the first user.

2. The method according to claim 1, wherein after the displaying of the at least one second user to the first user, the method further comprises:

looking up the information which includes the position information from among the information published in the past by the at least one second user; and displaying the related information which pertains to the position information.

3. The method according to claim 1, wherein before obtaining the information viewing operation performed on the information associated with the first user, the method further comprises:

obtaining information publishing operation of the first user, wherein the information which corresponds to the information publishing operation includes the position information.

4. The method according to claim 3, wherein the obtaining of the information publishing operation of the first user, comprises:

obtaining geographical location information of the first user or the information publishing operation;

obtaining at least one piece of alternative position information which corresponds to the geographical location information according to the geographical location information; and determining the at least one piece of alternative position information as the position information.

5. The method according to claim 1, wherein the obtaining of the at least one second user according to the position information, comprises:

determining a third user who publishes the position information;

obtaining a fourth user who is included both in the first user's user relationship chain and the third user's user relationship chain; and obtaining the at least one second user from the obtained fourth user according to the position information.

6. The method according to claim 1, wherein the method further comprises:

calling an interface between an information server and a server, and obtaining description information which corresponds to the position information from the information server, wherein the information server is used for collecting description information which corresponds to every position information.

7. The method according to claim 6, wherein the description information comprises at least one or more of: address information, contact information, review information, evaluation rating, activity information of the position information and the map of the district where the position information is located.

8. The method according to claim 1, wherein the information associated with the first user is the information published by the first user or the information published by the user in the first user's user relationship chain.

9. A device for displaying information which includes at least a processor with circuitry executing program codes stored in a memory, which configures the device to:

obtain first user's information viewing operation performed on information associated with the first user;

obtain position information included in the information associated with the first user;

obtain at least one second user according to the position information, wherein the second user is indirectly linked to the first user within a first user's user relationship chain in order to obtain related information published in the past by the second user pertaining to the position information; and display the at least one second user to the first user for obtaining related information published in the past by the second user according to a range of distance from the position information associated with the first user.

10. The device according to claim 9, further configured to:

look up the information which includes the position information from among the information published in the past by the at least one second user; and display the information which includes the position information.

11. The device according to claim 9, configured to:

obtain the information publishing operation of the first user, wherein the information which corresponds to the information publishing operation includes the position information.

12. The device according to claim 11, configured to:

obtain geographical location information of the first user or the information publishing operation;

obtain at least one piece of alternative position information which corresponds to the geographical location information according to the geographical location information; and determine the at least one piece of alternative position information as the position information.

13. The device according to claim 9, configured to:

determine a third user who publishes the position information;

obtain a fourth user who is included both in the first user's user relationship chain and the third user's user relationship chain; and obtain the at least one second user from the obtained fourth user according to the position information.

14. The device according to claim 9, configured to:

call an interface between an information server and a server, and obtain description information which corresponds to the position information from the information server, wherein the information server is used for collecting description information to correspond to every position information.

15. The device according to claim 14, wherein the description information comprises at least one or more of: address information, contact information, review information, evaluation rating, activity information of the position information and the map of the district where the position information is located.

16. The device according to claim 9, wherein the information associated with the first user is the information published by the first user or the information published by the user in the first user's user relationship chain.

17. A device for displaying information which links to related information provided by user's friends at user's location, the device includes at least a processor with circuitry executing program codes stored in a memory, which configures the device to:
- obtain first user's information viewing operation performed on the information associated with the first user;
- obtain position information included in the information associated with the first user;
- send the information displaying request to a server, wherein the information displaying request carries the position information and the displaying request sending module causes the server to return at least one second user according to the position information, wherein the second user is indirectly linked to the first user within a first user's user relationship chain in order to obtain related information published in the past by the second user pertaining to the position information; and
- display at least one second user returned by the server for obtaining related information published in the past by the second user according to a range of distance from the position information associated with the first user.

18. The device according to claim 17, configured to:
- obtain information viewing operation performed on the information of the at least one second user;
- send information viewing request to the server in order that the server looks up returned information which includes the position information among the information published in the past by the at least one second user; and
- display the related information which pertains to the position information.

19. The device according to claim 17, configured to:
- obtain information publishing operation of the first user, wherein the information which corresponds to the information publishing operation includes the position information.

20. The device according to claim 19, configured to:
- obtain geographical location information of the first user or the information publishing operation;
- obtain at least one piece of alternative position information which corresponds to the geographical location information according to the geographical location information;
- determine the at least one piece of alternative position information as the position information.

21. The device according to claim 17, configured to:
- obtain description information which corresponds to the position information sent by the server, wherein the description information is obtained by the server's operation of calling the interface between an information server and the server itself, and the information server is used for collecting description information which corresponds to the position information;
- display the description information.

22. The device according to claim 21, wherein the description information comprises at least one piece of address information, contact information, review information, evaluation rating, activity information of the position information and the map of the district where the position information is located.

23. The device according to claim 17, wherein the information associated with the first user is the information published by the first user or the information published by the user in the first user's user relationship chain.

* * * * *